Figures 1, 2:
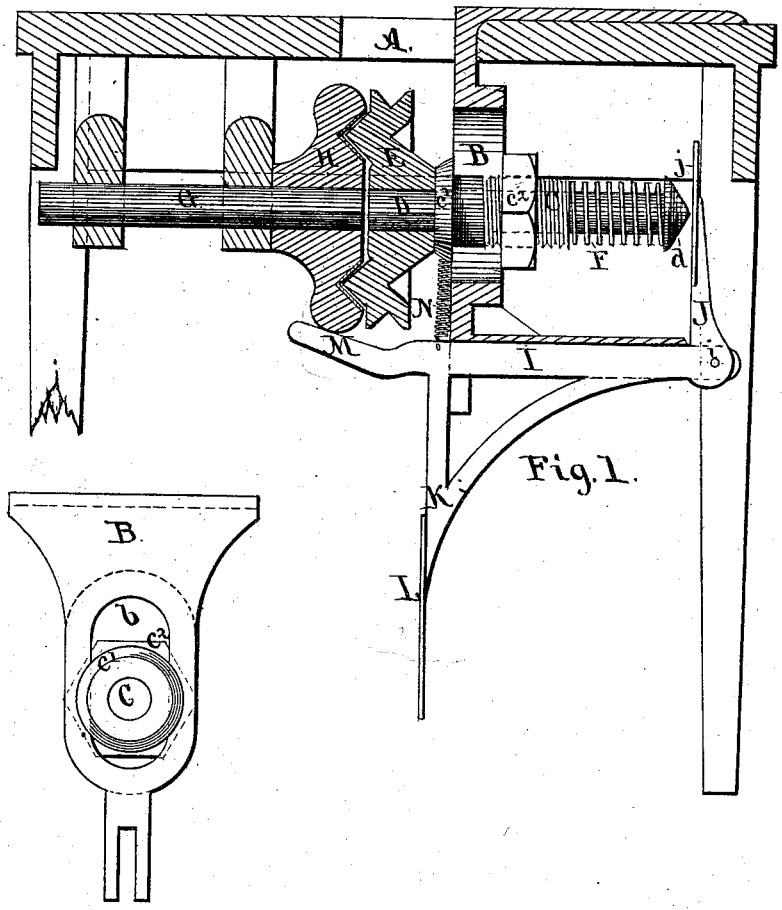

F. MILLER.
Device for Driving Sewing-Machines.

No. 168,660.

Patented Oct. 11, 1875.

Witnesses.

Inventor.
Francis Miller

UNITED STATES PATENT OFFICE.

FRANCIS MILLER, OF ALBANY, ASSIGNOR OF ONE-HALF HIS RIGHT TO THE EAST NEW YORK BOOT, SHOE, AND LEATHER MANUFACTURING COMPANY, OF NEW YORK, N. Y.

IMPROVEMENT IN DEVICES FOR DRIVING SEWING-MACHINES.

Specification forming part of Letters Patent No. 168,660, dated October 11, 1875; application filed August 7, 1874.

*To all whom it may concern:*

Be it known that I, FRANCIS MILLER, of the city and county of Albany, and State of New York, have invented a new Device for Driving Sewing-Machines and other light machinery, of which the following is a full and exact description, reference being had to the accompanying drawing making a part of this specification, in which—

Figure 1 is a longitudinal section, and Fig. 2 a front view, of the hanging bracket and sleeve.

My invention consists in the combination of the several parts composing the device, as herein described, by means of which the machines can be readily set in motion or instantly stopped, at the will of the operator.

As shown in the drawing, A represents the table or bench, upon which the machine to be driven rests. B is a hanging bracket secured to the table A. It is formed with a slotted opening, $b$, for the purpose of adjusting the shafts in perfect line with each other. C is an adjustable sleeve passing through the slotted opening of the bracket B. It is provided with a collar, $c^1$, which bears against the face of the bracket, and is secured to its place by means of the nut $c^2$, which screws upon the thread cut on the sleeve. D is a shaft, which has its bearing in the sleeve C, and to one end of which is secured the male friction-pulley E, which derives its motion, by means of a belt or band, from the "line-shafting." At the other end of the shaft D a conical or rounded head, $d$, is formed, which is extended beyond the diameter of the shaft, so as to form a collar or shoulder. F is a spring surrounding the shaft D, and is interposed between the end of the sleeve C and the shoulder of the head $d$, for the purpose of forcing the shaft back, so as to carry the friction-wheel E out of gear. G represents the driving-shaft of the sewing-machine, to which is secured the female friction-wheel H, the angular groove of which may be faced with leather or other material, to increase its adhesion to the male friction-wheel E and deaden the noise caused by throwing the two friction-wheels into gear. I is a bent lever, which has its fulcrum $i$ fixed in an extension of the bracket B. On its upper side it is provided with an arm, J, the face-plate $j$ of which is designed to bear against the conical head of the shaft D, for the purpose of forcing the friction-wheels E and H into contact with each other against the resistance of the spring F. K is an arm depending from the lever I, and provided with a pad, L, for receiving the pressure from the knee of the operator for throwing the friction-wheels into gear. M is an arm extending from the lever I, and forming a brake bearing against the wheel H, so as to instantly stop its rotation. N is a spring, one end of which is attached to the bracket B. The other end, being attached to the lever I, sustains the weight thereof, and imparts the requisite force to the brake M. Motion is imparted to the friction-pulley E by means of a belt or band from a pulley secured to the line-shaft, so that the shaft D is kept constantly revolving.

When it becomes necessary to set the sewing-machine in motion, the operator, by pressing against the pad L of the bent lever I, releases the brake M from the wheel H, and at the same time forces the two friction-wheels E and H into contact with each other, giving to the shaft G the same rate of speed acquired by the shaft D. Upon releasing the pressure from the pad L the bent lever I is carried upward by the spring N, releasing the face-plate $j$ from its bearing against the end of the shaft D, and permitting the spring F to force the shaft back, so as to carry the male and female frictions apart. Simultaneously with this the brake M is brought by the action of the spring N into contact with the wheel H, and instantly stops its motion.

Instead of attaching the pad L directly to the bent lever I, in the manner shown, it may be attached to it by means of a rod interposed between the pad and lever, when required by the character of the machine to remove the lever farther from the operator; or, when desirable, the lever I may be worked by the foot of the operator by simply attaching it to a treadle by means of a connecting-rod.

It will readily be seen that by using this device the sewing-machines can be readily removed from the table for examination or repairs without requiring the removal of the bands from the pulleys, thereby avoiding a source of great danger and annoyance common to the driving devices now generally used.

I claim as my invention—

1. The bracket B, having a slotted opening, b, in combination with the adjustable sleeve C and shaft D, substantially as and for the purpose herein specified.

2. The driving-shaft D, carrying the friction-wheel E, and having its sliding movement controlled by the spring F and lever I, in combination with an independent shaft, G, carrying the friction-wheel H, as and for the purpose set forth.

3. The combination of the lever I and brake M with the spring N, substantially as and for the purpose described.

4. The combination of the bracket B, adjustable sleeve C, shafts D and G, friction-wheels E and H, springs F and N, lever I, and brake M, substantially as and for the purposes herein specified.

FRANCIS MILLER.

Witnesses:
S. J. HAIGHT,
WILLIAM H. LOW.